(12) United States Patent
Zuo et al.

(10) Patent No.: US 9,985,525 B2
(45) Date of Patent: May 29, 2018

(54) POWER CONVERTER AND SWITCHING POWER SUPPLY DEVICE

(71) Applicants: SHENZHEN SKYWORTH-RGB ELECTRONIC CO., LTD., Shenzhen, Guangdong (CN); SHENZHEN SKYWORTH SEMICONDUCTOR DESIGN CENTER CO., LTD., Shenzhen, Guangdong (CN)

(72) Inventors: Shijun Zuo, Guangdong (CN); Lu Chen, Guangdong (CN); Mouyan Teng, Guangdong (CN)

(73) Assignees: SHENZHEN SKYWORTH-RGB ELECTRONIC CO., LTD., Shenzhen (CN); SHENZHEN SKYWORTH SEMICONDUCTOR DESIGN CENTER CO., LTD., Shenzhen (CN)

( * ) Notice: Subject to any disclaimer, the term of this patent is extended or adjusted under 35 U.S.C. 154(b) by 0 days. days.

(21) Appl. No.: 15/317,126

(22) PCT Filed: Jan. 28, 2016

(86) PCT No.: PCT/CN2016/072478
§ 371 (c)(1),
(2) Date: Dec. 8, 2016

(87) PCT Pub. No.: WO2017/004984
PCT Pub. Date: Jan. 12, 2017

(65) Prior Publication Data
US 2017/0187287 A1    Jun. 29, 2017

(30) Foreign Application Priority Data
Jul. 7, 2015 (CN) .......................... 2015 1 0394324

(51) Int. Cl.
  H02M 3/158  (2006.01)
  H02M 1/08   (2006.01)
  H02M 1/00   (2006.01)

(52) U.S. Cl.
  CPC ............ *H02M 3/158* (2013.01); *H02M 1/08* (2013.01); *H02M 2001/0009* (2013.01)

(58) Field of Classification Search
CPC . H02M 1/08; H02M 3/158; H02M 2001/0009
See application file for complete search history.

(56) References Cited

U.S. PATENT DOCUMENTS 7,061,218 B2 * 6/2006  Ito ....................... H02M 3/1588
                                                        323/224
8,295,020 B2 * 10/2012 Oki ........................ H02M 1/08
                                                        361/101
(Continued)

FOREIGN PATENT DOCUMENTS

CN      101728954 A    6/2010
CN      103475216 A    12/2013

OTHER PUBLICATIONS

1st Office Action of counterpart Chinese Patent Application No. 201510394324.2 dated May 3, 2017.

*Primary Examiner* — Fred E Finch, III
*Assistant Examiner* — Demetries A Gibson

(57) ABSTRACT

The present disclosure discloses a power converter and a switching power supply device. The power converter includes an energy storing and outputting circuit used for charging a load after storing energy, a main switch used for transmitting input power to the energy storing and outputting circuit when the main switch is conducting, an after flow switch used for supplying an after flow loop to the energy storing and outputting circuit when the main switch is shut down, a driving circuit used for changing connecting states of the main switch and the after flow switch according (Continued)

to a preset clock frequency, and a testing circuit and a feedback circuit, the testing circuit is used for testing a voltage on a connecting node of the main switch and the after flow switch.

16 Claims, 3 Drawing Sheets

(56) References Cited

U.S. PATENT DOCUMENTS

| | | | | |
|---|---|---|---|---|
| 8,456,143 | B2* | 6/2013 | Nakashima | H02M 3/1588 323/224 |
| 2006/0113980 | A1* | 6/2006 | Yoshida | H02M 3/1588 323/282 |
| 2008/0246455 | A1* | 10/2008 | Chu | H02M 3/1588 323/283 |
| 2011/0018516 | A1* | 1/2011 | Notman | H02M 3/1588 323/284 |
| 2011/0169469 | A1* | 7/2011 | Li | H02M 1/32 323/282 |
| 2013/0093404 | A1* | 4/2013 | Park | H02M 1/32 323/273 |
| 2015/0113294 | A1* | 4/2015 | Zhang | H02M 3/158 713/300 |
| 2015/0256075 | A1* | 9/2015 | Lin | H02M 3/158 323/271 |
| 2017/0063227 | A1* | 3/2017 | Nakamura | H02M 3/158 |

* cited by examiner

POWER CONVERTER AND SWITCHING POWER SUPPLY DEVICE

FIELD OF THE DISCLOSURE

The present disclosure relates to the field of switching power technologies, and in particular, to a power converter and a switching power supply device.

BACKGROUND OF THE DISCLOSURE

Currently, step-down direct current power converter is widely used for the working frequency of the power converter's circuit is high, and the circuit is stably.

The traditional step-down direct current power converter normally adopts a pulse width modulation mode to drive, so, no matter the step-down direct current power converter is in a overloading mode, or a light loading mode, an outputting inductor is always working at a current continuous mode (CCM), that is, a current of the inductor is always larger than zero. In the current continuous mode, a conducting cycle (frequency) of a switching tube does not change, and equals to a clock frequency, the power converter merely adjusts outputting to adjust outputting power of the circuit.

However, every time the switching tube is conducting or shutting down, it consumes a certain amount of power, if the conducting times of the switching tube is reduced, and the load works as usual, so an aim of reducing the consumption of the circuit is realized, however, currently there is no corresponding method to solve the problem of the switching consumption of the step-down direct current power converter.

SUMMARY OF THE DISCLOSURE

The present disclosure is to provide a power converter, which aims to reduce the switching consumption of the step-down direct current power converter, and improve a light loading efficiency.

In order to achieve the above aim, the present disclosure provides a power converter, the power converter includes a main switch and an after flow switch connected in series between a power supply and a ground, an energy storing and outputting circuit connected with a connecting node of the main switch and the after flow switch, a driving circuit changes connecting states of the main switch and the after flow switch according to a preset clock frequency, when the main switch is conducting, the energy storing and outputting circuit is in a charging energy-storing state and an outputting state; when the after flow switch is conducting, the energy storing and outputting circuit is in the outputting state; when the energy storing and outputting circuit is in the outputting state, the energy storing and outputting circuit supplies a working voltage to a load;

the power converter includes a testing circuit and a feedback circuit, a signal acquiring end of the testing circuit is connected with the connecting mode of the main switch and the after flow switch, an outputting end of the testing circuit is connected with the driving circuit; a signal acquiring end of the feedback circuit is connected with an outputting end of the energy-storing circuit, an outputting end of the feedback circuit is connected with a feedback end of the driving circuit; and, the testing circuit, which is used for testing a voltage on the connecting node of the main switch and the after flow switch, when the voltage on the connecting node is larger than zero, the testing circuit outputs a first controlling signal to the driving circuit, for the driving circuit controlling the after flow switch to change from the conducting state to a shutting down state, and the load works normally through voltage stored in the energy storing and outputting circuit;

the feedback circuit, which is used for testing the voltage stored in the energy storing and outputting circuit, and when the voltage stored in the energy storing and outputting circuit is smaller than a preset voltage value, the feedback circuit outputs a trigger signal to the driving circuit, allowing the driving circuit controlling the main switch to change from the shutting down state to the conducting state, and the energy-storing device is charged again.

Preferably, the load includes a power supply end and a ground end, the power supply end is connected with the outputting end of the energy storing and outputting circuit, the ground end of the load is earthed; the energy storing and outputting circuit includes a first inductor and a first capacitor, an inputting end of the first inductor is connected with the connecting node of the main switch and the after flow switch, an outputting end of the first inductor is connected with a first end of the first capacitor, and one end of the outputting end of the first inductor connected with the first end of the capacitor is the outputting end of the energy-storing outputting circuit; a second end of the first capacitor is earthed.

Preferably, the feedback circuit includes a first resistor and a second resistor, a first end of the first resistor is connected between the outputting end of the energy storing and outputting circuit and the power supply end of the load, a second end of the first resistor is earthed through the second resistor; a connecting node of the first resistor and the second resistor is the outputting end of the feedback circuit.

Preferably, the driving circuit includes a controller, a PWM controlling circuit and a logic circuit; the PWM controlling circuit includes a first end inputting a first reference voltage signal, a second end inputting a second reference voltage signal; the logic circuit includes a first end connected with an outputting end of the PWM controlling circuit, and a second end used for receiving the first controlling signal, a third end used for inputting a preset clock frequency and an outputting end; the outputting end of the logic circuit is connected with the controller; when a feedback of the feedback circuit is that the voltage stored in the energy storing and outputting circuit is smaller than the first preset voltage vale, the PWM controlling circuit is used for outputting a second trigger signal, after the second trigger signal is logically treated, the logically treated second trigger signal is sent to the controller, for the controller controlling the main switch to change from the shutting down state to the conducting state, the energy storing and outputting circuit is charged again.

Preferably, the PWM controlling circuit includes an error amplifier and a first voltage comparator; the logic circuit includes a first nand gate, a second nand gate, a first inverter and a first trigger; a non-inverting inputting end of the error amplifier inputs the first reference voltage signal, a non-inverting inputting end of the first voltage comparator inputs the second reference voltage signal, a clock inputting end of the first trigger inputs the preset clock frequency signal; the controller includes a first driving pin, a second driving pin, a first inputting pin and a second inputting pin, the first driving pin is connected with a controlled end of the main switch, the second driving pin of the controller is connected with a controlled end of the after flow switch, the first inputting pin of the controller is connected with an outputting end of the first trigger, a second inputting pin of the controller is connected with the outputting end of the testing circuit; a inverting inputting end of the error amplifier is the feedback end of the driving circuit, an outputting end of the error amplifier is connected with a inverting inputting end of the first voltage comparator; an outputting end of the first voltage comparator is connected with a first inputting end of the first nand gate, a second inputting end of the first nand gate is connected with an outputting end of the second nand gate, an outputting end of the first nand gate is connected with a trigger end of the first trigger through the first inverter; a first inputting end of the second nand gate is connected with an outputting end of the first trigger, a second inputting end of the second nand gate is connected with the outputting end of the testing circuit.

Preferably, the driving circuit further includes a current sampling module, a first sampling end of the current sampling module is connected with the inputting end of the main switch, a second sampling end of the current sampling module is connected with the outputting end of the main switch; the current sampling module samples current signals of the inputting end and the outputting end of the main switch, and outputs voltage signals corresponding to the current signals; an non-inverting inputting end of the first voltage comparator is connected with the outputting end of the current sampling module, for receiving the voltage signal outputted by the current sampling module, and the voltage signal is regarded as the second reference voltage signal.

Preferably, the testing circuit includes a first direct-current power supply, a first switch testing device, a current mirroring circuit, a first sampling circuit, a second sampling circuit, a comparing outputting circuit, the current mirroring circuit includes a starting end, an inputting end, a first outputting end, a second outputting end, the starting end of the current mirroring circuit is connected with an external power, the inputting end of the current mirroring circuit is connected with the first direct current power supply, the first outputting end of the current mirroring circuit is connected with the first sampling circuit, the second outputting end of the current mirroring circuit is connected with the second sampling circuit; the first switch testing device includes a first testing end, a second testing end, and a controlling end, the first testing end of the first switch testing device is connected with the connecting node of the main switch and the after flow switch; the second testing end of the first switch testing device is connected with the controlled end of the after flow switch; the first controlling end of the first switch testing device is connected with the first sampling circuit, the second controlling end of the first switch testing device is connected with the second sampling circuit;

the first switch testing device tests that a voltage on the controlled end of the after flow switch is high level, and a voltage on the connecting node of the main switch and the after flow switch is larger than zero, the first switch testing device controls the current mirroring circuit to work at a first outputting mode, for a voltage value sampled by the second sampling circuit being larger than a voltage value sampled by the first sampling circuit;

when the voltage sampled by the first sampling circuit is larger than the voltage sampled by the second sampling circuit, the comparing outputting circuit outputs the first controlling signal.

Preferably, the first switch testing device includes a second inverter, a first switching tube, a second switching tube and a seventh switching tube; the current mirroring circuit includes a third switching tube, a fourth switching tube, a fifth switching tube and a sixth switching tube; the comparing outputting circuit includes a second voltage comparator, a second trigger and a third inverter; the first sampling circuit includes a third resistor and a fifth resistor; the second sampling circuit includes a fourth resistor and a sixth resistor; an inputting end of the second inverter is connected with the controlled end of the after flow switch, an outputting end of the second inverter is connected with a gate of the first switching tube; a drain of the first switching tube is earthed, a source of the first switching tube is connected with a drain of the second switching tube; a gate of the second switching tube is connected with the controlled end of the after flow switch, the source of the second switch tube is connected with the connecting node of the main switch and the after flow switch; a gate of the third switching tube, a gate of the fourth switching tube, a gate of the fifth switching tube and a gate of the sixth switching tube are connected with each other, and after connected with each other, the gate of the third switching tube, the gate of the fourth switching tube, the gate of the fifth switching tube and the gate of the sixth switching tube are connected with the external power controlling the conducting of the third switching tube, the fourth switching tube, the fifth switching tube and the sixth switching tube; a source of the third switching tube, a source of the fourth switching tube, a source of the fifth switching tube and a source of the sixth switching tube are connected with each other, and after connected with each other, the third switching tube, the fourth switching tube, the fifth switching tube and the sixth switching tube are connected with the first direct current power, a drain of the third switching tube is connected the gate; a drain of the fourth switching tube is connected with a first end of the third resistor; a drain of the fifth switching tube is connected with a source of the seventh switching tube; a drain of the sixth switching tube is respectively connected with a first end of the fourth resistor and a drain of the seventh switching tube; a gate of the seventh switching tube is connected with a gate of the after flow switch; a second end of the third resistor is connected with a first end of the fifth resistor; a second end of the fifth resistor is respectively connected with the source of the first switching tube and the drain of the second switching tube; a second of the fourth resistor is earthed by the sixth resistor; the non-inverting inputting end of the second voltage comparator is connected a connecting node of the third resistor and the fifth resistor, the inverting end of the second voltage comparator is connected with a connecting node of the fourth resistor and the sixth resistor, the outputting end of the second voltage comparator is connected with the inputting end of the second trigger; a trigging end of the second trigger is connected with an external trigger signal, the outputting end of the second trigger inputs an inputting end of the third inverter, an outputting end of the third inverter is the outputting end of the testing circuit.

Preferably, the testing circuit further includes a delay module used for triggering a shutting down of the main switch, an inputting end of the delay module is respectively connected with the first outputting pin of the controller and the controlled end of the main switch, an outputting end of the delay module is connected with the trigger end of the second trigger; when the main switch is turn on, the delay module is used for outputting a delay signal for controlling the testing circuit outputting the first controlling signal after a preset time.

Preferably, the delay module includes an energy-storing device and a second switch testing device connected with the energy-storing device, when the second switch testing device tests that the main switch is turn on, the energy-storing device is used for storing energy, and when the energy-storing voltage is larger than a preset voltage value, the energy-storing device outputs the delay signal.

Preferably, the second switch testing device includes a second direct current power, a fourth inverter, a fifth inverter, an eighth switching tube and a ninth switching tube; the energy-storing device includes a sixth inverter, a tenth switching tube, an eleventh switching tube, a twelfth switching tube and a second capacitor, an inputting end of the fourth inverter is connected with the controlled end of the main switch, an outputting end of the fourth inverter is connected with an inputting end of the fifth inverter, an outputting end of the fifth inverter is connected with a gate of the eighth switching tube; a drain of the eighth switching tube is earthed, a source of the eighth switching tube is connected a drain of the ninth switching tube; a source of the ninth switching tube, a source of the tenth switching tube and a source of the eleventh switching tube are connected with each other, and after connected with each other, the source of the ninth switching tube, the source of the tenth switching tube and the source of the eleventh switching tube are connected with a second direct current power; a gate of the ninth switching tube inputs an external power for controlling the conducting of the eighth switching tube; a gate of the tenth switching tube is earthed, a drain of the tenth switching tube is connected with the a drain of the twelfth switching tube; a gate of the eleventh switching tube is connected with an outputting end of the third inverter, a drain of the eleventh switching tube is connected with an inputting end of the sixth inverter, an outputting end of the sixth inverter is connected with the trigger end of the second trigger; a gate of the twelfth switching tube, a drain of the eighth of the switching tube, a drain of the ninth switching tube and a first end of the second capacitor are connected with each other, a source of the twelfth switching tube and a second end of the second capacitor are respectively earthed.

In addition, in order to achieve the above aim, the present disclosure also provides A switching power supply device, which includes the power converter; the power converter includes a main switch and an after flow switch connected in series between a power supply and a ground, an energy storing and outputting circuit connected with a connecting node of the main switch and the after flow switch, a driving circuit changes connecting states of the main switch and the after flow switch according to a preset clock frequency, when the main switch is conducting, the main switch makes the energy storing and outputting circuit to be in a charging energy-storing state and an outputting state; when the after flow switch is conducting, the after flow switch makes the energy storing and outputting circuit to be in the outputting state; when the energy storing and outputting circuit is in the outputting state, the energy storing and outputting circuit supplies a working voltage to a load;

the power converter includes a testing circuit and a feedback circuit, a signal acquiring end of the testing circuit is connected with the connecting mode of the main switch and the after flow switch, an outputting end of the testing circuit is connected with the driving circuit; a signal acquiring end of the feedback circuit is connected with an outputting end of the energy-storing circuit, an outputting end of the feedback circuit is connected with a feedback end of the driving circuit; and, the testing circuit, which is used for testing a voltage on the connecting node of the main switch and the after flow switch, when the voltage on the connecting node is larger than zero, the testing circuit outputs a first controlling signal to the driving circuit, for the driving circuit controlling the after flow switch to change from the conducting state to a shutting down state, and the load works normally through the voltage stored in the energy storing and outputting circuit;

the feedback circuit, which is used for testing the voltage stored in the energy storing and outputting circuit, and when the voltage stored in the energy storing and outputting circuit is smaller than a preset voltage value, the feedback circuit outputs a trigger signal to the driving circuit, for the driving circuit controlling the main switch to change from the shutting down state to the conducting state, and the energy-storing device is charged again.

Preferably, the driving circuit includes a controller, a PWM controlling circuit and a logic circuit; the PWM controlling circuit includes a first end inputting a first reference voltage signal, a second end inputting a second reference voltage signal; the logic circuit includes a first end connected with an outputting end of the PWM controlling circuit, and a second end used for receiving the first controlling signal, a third end used for inputting a preset clock frequency and an outputting end; the outputting end of the logic circuit is connected with the controller; when a feedback of the feedback circuit is that the voltage stored in the energy storing and outputting circuit is smaller than the first preset voltage vale, the PWM controlling circuit is used for outputting a second trigger signal, after the second trigger signal is logically treated, the logically treated second trigger signal is sent to the controller, for the controller controlling the main switch to change from the shutting down state to the conducting state, the energy storing and outputting circuit is charged again.

Preferably, the PWM controlling circuit includes an error amplifier and a first voltage comparator; the logic circuit includes a first nand gate, a second nand gate, a first inverter and a first trigger; a non-inverting inputting end of the error amplifier inputs the first reference voltage signal, a non-inverting inputting end of the first voltage comparator inputs the second reference voltage signal, a clock inputting end of the first trigger inputs the preset clock frequency signal; the controller includes a first driving pin, a second driving pin, a first inputting pin and a second inputting pin, the first driving pin is connected with a controlled end of the main switch, the second driving pin of the controller is connected with a controlled end of the after flow switch, the first inputting pin of the controller is connected with an outputting end of the first trigger, a second inputting pin of the controller is connected with the outputting end of the testing circuit; a inverting inputting end of the error amplifier is the feedback end of the driving circuit, an outputting end of the error amplifier is connected with a inverting inputting end of the first voltage comparator; an outputting end of the first voltage comparator is connected with a first inputting end of the first nand gate, a second inputting end of the first nand gate is connected with an outputting end of the second nand gate, an outputting end of the first nand gate is connected with a trigger end of the first trigger through the first inverter; a first inputting end of the second nand gate is connected with an outputting end of the first trigger, a second inputting end of the second nand gate is connected with the outputting end of the testing circuit.

Preferably, the driving circuit further includes a current sampling module, a first sampling end of the current sampling module is connected with the inputting end of the main switch, a second sampling end of the current sampling module is connected with the outputting end of the main switch; the current sampling module samples current signals of the inputting end and the outputting end of the main switch, and outputs voltage signals corresponding to the current signals; an non-inverting inputting end of the first voltage comparator is connected with the outputting end of the current sampling module, for receiving the voltage signal outputted by the current sampling module, and the voltage signal is regarded as the second reference voltage signal.

Preferably, wherein the testing circuit includes a first direct-current power supply, a first switch testing device, a current mirroring circuit, a first sampling circuit, a second sampling circuit, a comparing outputting circuit, the current mirroring circuit includes a starting end, an inputting end, a first outputting end, a second outputting end, the starting end of the current mirroring circuit is connected with an external power, the inputting end of the current mirroring circuit is connected with the first direct current power supply, the first outputting end of the current mirroring circuit is connected with the first sampling circuit, the second outputting end of the current mirroring circuit is connected with the second sampling circuit; the first switch testing device includes a first testing end, a second testing end, and a controlling end, the first testing end of the first switch testing device is connected with the connecting node of the main switch and the after flow switch; the second testing end of the first switch testing device is connected with the controlled end of the after flow switch; the first controlling end of the first switch testing device is connected with the first sampling circuit, the second controlling end of the first switch testing device is connected with the second sampling circuit;

the first switch testing device tests that a voltage on the controlled end of the after flow switch is high level, and a voltage on the connecting node of the main switch and the after flow switch is larger than zero, the first switch testing device controls the current mirroring circuit to work at a first outputting mode, for a voltage value sampled by the second sampling circuit being larger than a voltage value sampled by the first sampling circuit;

when the voltage sampled by the first sampling circuit is larger than the voltage sampled by the second sampling circuit, the comparing outputting circuit outputs the first controlling signal.

Preferably, the first switch testing device includes a second inverter, a first switching tube, a second switching tube and a seventh switching tube; the current mirroring circuit includes a third switching tube, a fourth switching tube, a fifth switching tube and a sixth switching tube; the comparing outputting circuit includes a second voltage comparator, a second trigger and a third inverter; the first sampling circuit includes a third resistor and a fifth resistor; the second sampling circuit includes a fourth resistor and a sixth resistor; an inputting end of the second inverter is connected with the controlled end of the after flow switch, an outputting end of the second inverter is connected with a gate of the first switching tube; a drain of the first switching tube is earthed, a source of the first switching tube is connected with a drain of the second switching tube; a gate of the second switching tube is connected with the controlled end of the after flow switch, the source of the second switch tube is connected with the connecting node of the main switch and the after flow switch; a gate of the third switching tube, a gate of the fourth switching tube, a gate of the fifth switching tube and a gate of the sixth switching tube are connected with each other, and after connected with each other, the gate of the third switching tube, the gate of the fourth switching tube, the gate of the fifth switching tube and the gate of the sixth switching tube are connected with the external power controlling the conducting of the third switching tube, the fourth switching tube, the fifth switching tube and the sixth switching tube; a source of the third switching tube, a source of the fourth switching tube, a source of the fifth switching tube and a source of the sixth switching tube are connected with each other, and after connected with each other, the third switching tube, the fourth switching tube, the fifth switching tube and the sixth switching tube are connected with the first direct current power, a drain of the third switching tube is connected the gate; a drain of the fourth switching tube is connected with a first end of the third resistor; a drain of the fifth switching tube is connected with a source of the seventh switching tube; a drain of the sixth switching tube is respectively connected with a first end of the fourth resistor and a drain of the seventh switching tube; a gate of the seventh switching tube is connected with a gate of the after flow switch; a second end of the third resistor is connected with a first end of the fifth resistor; a second end of the fifth resistor is respectively connected with the source of the first switching tube and the drain of the second switching tube; a second of the fourth resistor is earthed by the sixth resistor; the non-inverting inputting end of the second voltage comparator is connected a connecting node of the third resistor and the fifth resistor, the inverting end of the second voltage comparator is connected with a connecting node of the fourth resistor and the sixth resistor, the outputting end of the second voltage comparator is connected with the inputting end of the second trigger; a trigging end of the second trigger is connected with an external trigger signal, the outputting end of the second trigger inputs an inputting end of the third inverter, an outputting end of the third inverter is the outputting end of the testing circuit.

Preferably, the testing circuit further includes a delay module used for triggering a shutting down of the main switch, an inputting end of the delay module is respectively connected with the first outputting pin of the controller and the controlled end of the main switch, an outputting end of the delay module is connected with the trigger end of the second trigger; when the main switch is turn on, the delay module is used for outputting a delay signal for controlling the testing circuit outputting the first controlling signal after a preset time.

Preferably, the delay module includes an energy-storing device and a second switch testing device connected with the energy-storing device, when the second switch testing device tests that the main switch is turn on, the energy-storing device is used for storing energy, and when the energy-storing voltage is larger than a preset voltage value, the energy-storing device outputs the delay signal.

Preferably, the second switch testing device includes a second direct current power, a fourth inverter, a fifth inverter, an eighth switching tube and a ninth switching tube; the energy-storing device includes a sixth inverter, a tenth switching tube, an eleventh switching tube, a twelfth switching tube and a second capacitor, an inputting end of the fourth inverter is connected with the controlled end of the main switch, an outputting end of the fourth inverter is connected with an inputting end of the fifth inverter, an outputting end of the fifth inverter is connected with a gate of the eighth switching tube; a drain of the eighth switching tube is earthed, a source of the eighth switching tube is connected a drain of the ninth switching tube; a source of the ninth switching tube, a source of the tenth switching tube and a source of the eleventh switching tube are connected with each other, and after connected with each other, the source of the ninth switching tube, the source of the tenth switching tube and the source of the eleventh switching tube are connected with a second direct current power; a gate of the ninth switching tube inputs an external power for controlling the conducting of the eighth switching tube; a gate of the tenth switching tube is earthed, a drain of the tenth switching tube is connected with the a drain of the twelfth switching tube; a gate of the eleventh switching tube is connected with an outputting end of the third inverter, a drain of the eleventh switching tube is connected with an inputting end of the sixth inverter, an outputting end of the sixth inverter is connected with the trigger end of the second trigger; a gate of the twelfth switching tube, a drain of the eighth of the switching tube, a drain of the ninth switching tube and a first end of the second capacitor are connected with each other, a source of the twelfth switching tube and a second end of the second capacitor are respectively earthed.

The preset disclosure sets the main switch and the after flow switch connected in series between the power supply and the ground, the energy storing and outputting circuit connected with the connecting node of the main switch and the after flow switch, a driving circuit changes connecting states of the main switch and the after flow switch according to a preset clock frequency and the testing circuit and the feedback circuit, and, the testing circuit is used for testing the voltage of the connecting node of the main switch and the after flow switch, when the voltage on the connecting node is larger than zero, the testing circuit outputs the first controlling signal to the driving circuit, for the driving circuit controlling the after flow switch to shutting down, and the load works normally through voltage stored in the energy storing and outputting circuit; and, the feedback circuit is used for testing the voltage stored in the energy storing and outputting circuit, and when the voltage stored in the energy storing and outputting circuit is smaller than a lowest voltage which can maintain the load to work normally, the feedback circuit outputs a trigger signal to the driving circuit, allowing the driving circuit controlling the main switch to change from the shutting down state to the conducting state, and the energy-storing device being charged again; it is to be understood that, as when the after flow switch is shutting down, the main switch is not turn on immediately to supply power to the load, while the load is power for a while through energy stored in the energy-storing outputting circuit, so that the shutting cycle of the main switch increases, and in the same time, the conducting times of the switch decreases, and the switching consumption of the circuit is reduced.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

The present disclosure provides a power converter.

Figure 1:
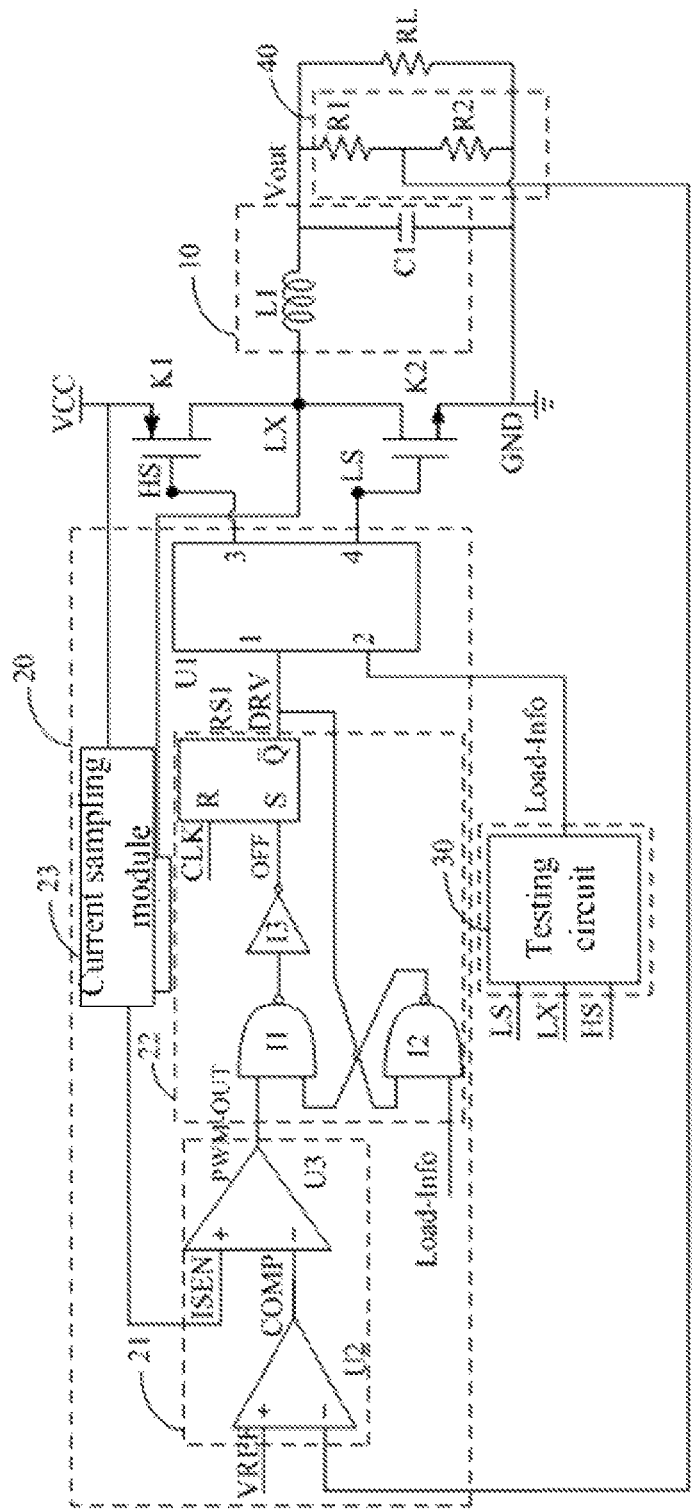
FIG. 1 is a circuit structure diagram of a power converter according to a preferable exemplary embodiment.
Figure 2:
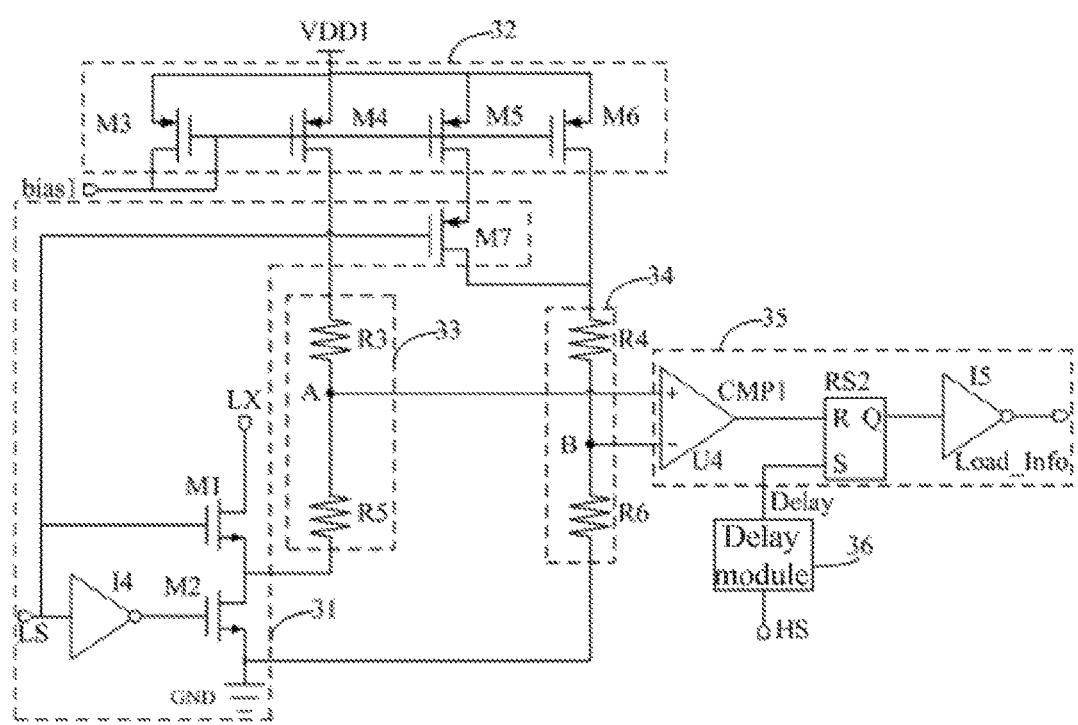
FIG. 2 is a circuit structure diagram of a testing circuit in the power converter shown FIG. 1.
Figure 3:
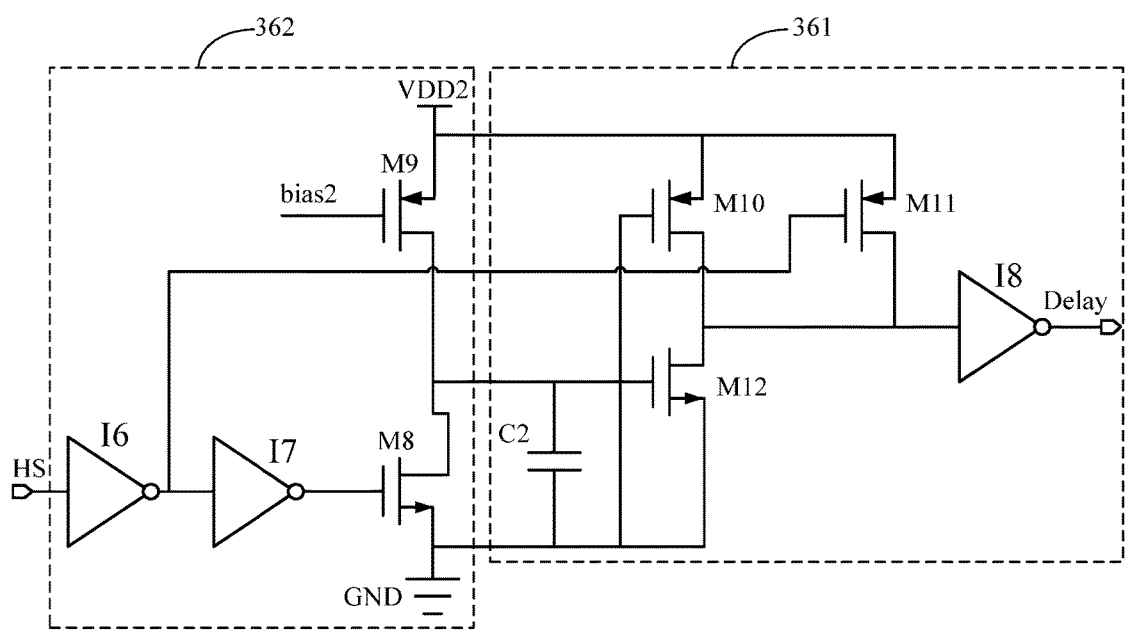
FIG. 3 is a circuit structure diagram of a delay module in the testing circuit shown FIG. 2.

Referring to FIGS. 1-3, in an exemplary embodiment, the power converter includes a main switch K1 and an after flow switch K2 connected in series between a power supply VCC and a ground, an energy storing and outputting circuit 10 connected with a connecting node LX of the main switch K1 and the after flow switch K2, a driving circuit 20 changes connecting states of the main switch K1 and the after flow switch K2 according to a preset clock frequency, the energy storing and outputting circuit 10 stores energy for supplying a working voltage to a load RL, when the main switch K1 is conducting, a direct power source inputted by the power supply VCC is transmitted to the energy storing and outputting circuit 10, for controlling the energy storing and outputting circuit 10 to be in a charging energy-storing state and an outputting state; when the main switch K1 is shutting down, the after flow switch K2 is conducting and supplies an after flow switch loop for the energy storing and outputting circuit 10, for controlling the energy storing and outputting circuit 10 to be in the outputting state; when the energy storing and outputting circuit 10 is in the outputting state, the energy storing and outputting circuit 10 supplies power source voltage to the load RL, for the load RL working normally.

In order to reduce the conducting times of the switch, to reduce the switching consumption of the circuit, the power converter further includes a testing circuit 30 and a feedback circuit 40, the testing circuit 30 is used for testing a voltage on the connecting node LX of the main switch K1 and the after flow switch K2, and when the voltage on the connecting node LX is larger than zero, the testing circuit 30 outputs a first controlling signal to the driving circuit 20, for the driving circuit 20 controlling the after flow switch K2 to change from the conducting state to a shutting down state (at this time, the main switch K1 is also in the shutting down state), and the load RL works normally through the voltage stored in the energy storing and outputting circuit 10; the feedback circuit 40 is used for testing the voltage stored in the energy storing and outputting circuit 10, and when the voltage stored in the energy storing and outputting circuit 10 is smaller than a first preset voltage, the feedback circuit 40 outputs a trigger signal to the driving circuit 20, for the driving circuit 20 controlling the main switch K1 to change from the shutting down state to the conducting state, and the energy-storing and outputting device 10 is charged again. It is to be understood that, as when the after flow switch K2 is shutting down, it is to be understood that, as when the after flow switch is shutting down, the main switch K1 is not turn on immediately to supply power to the load RL, while the load RL is power for a while through energy stored in the energy-storing outputting circuit 10, so that the shutting cycle of the main switch K1 increases, and in the same time, the conducting times of the switch decreases, and the switching consumption of the circuit is reduced.

In detail, a signal acquiring end of the testing circuit 30 is connected with the connecting node LX of the main switch K1 and the after flow switch K2, an outputting end of the testing circuit 30 is connected with the driving circuit 20; a signal acquiring end of the feedback circuit 40 is connected with an outputting end of the energy-storing outputting circuit 10, an outputting end of the feedback circuit 40 is connected with a feedback end of the driving circuit 20. And, preferably, a preset voltage value is regarded as a lowest working voltage for maintaining the load RL to work normally, the voltage is lower than the lowest working voltage for maintaining the load RL to work normally, it is not limited here.

The load RL includes a power supply end and a ground end, the power supply end is connected with the outputting end of the energy storing and outputting circuit 10, the ground end of the load RL is earthed; the main switch K1 and the after flow switch K2 is realized by MOS tube, and preferably, the main switch K1 adopts PMOS tube, the after flow switch K2 adopts NMOS tube. And, HS is a connecting node of a controlled end of the main switch K1 and a first outputting pin of the controller, LS is a connecting node of a controlled end of the after flow switch K2 and a second outputting pin of the controller;

The energy storing and outputting circuit 10 includes a first inductor L1 and a first capacitor C1. When the main switch K1 is conducting, the first inductor L1 receives supply voltage inputted by the power supply VCC to store energy and output the energy to the load RL. The first capacitor C1 is an energy-storing capacity, when the main switch K1 and the after flow switch K2 are both shut down, the first capacitor C1 is used for outputting energy to the load RL for maintaining the load RL continuous to work for a while, time of the load RL continuous to work is determined by an quantity of electric charge stored in the first capacitor C1, that is, a capacitor having a bigger capacity is chosen, the load RL can work for a longer time, so that the conducting time of a next cycle of the main switch K1 is delayed, that is, the turning on/off cycle of the whole circuit is delayed, and the conducting times of the switch are reduced, the switch consumption is reduced.

And, an inputting end of the first inductor L1 is connected with the connecting node LX of the main switch K1 and the after flow switch K2, an outputting end L1 of the first inductor is connected with a first end of the first capacitor C1, and one end of the outputting end of the first inductor L1 connected with the first end of the capacitor C1 is the outputting end of the energy-storing outputting circuit 10; a second end of the first capacitor C1 is earthed.

The feedback circuit 40 includes a first resistor R1 and a second resistor R2, a first end of the first resistor R1 is connected between the outputting end of the energy storing and outputting circuit 10 and the power supply end of the load RL, the second end of the first resistor R1 is earthed through the second resistor R2; a connecting node of the first resistor R1 and the second resistor R2 is the outputting end of the feedback circuit 40. In the feedback circuit 40, the first resistor R1 and the second resistor R2 form a bleeder circuit, the bleeder circuit samples the supply voltage outputted by the first inductor L1, and feedback.

The driving circuit 20 can be realized by any circuit which can realize its function, in an preferably exemplary embodiment, the driving circuit 20 includes a controller U1, a PWM controlling circuit 21 and a logic circuit 22; the PWM controlling circuit 21 includes a first end inputting a first reference voltage signal VREF, a second end inputting a second reference voltage signal ISEN; the logic circuit 22 includes a first end connected with an outputting end of the PWM controlling circuit 21, and a second end used for receiving the first controlling signal, a third end used for inputting the preset clock frequency and an outputting end; the outputting end of the logic circuit 22 is connected with the controller; when the feedback circuit 40 receives the first controlling signal, the PWM controlling circuit 21 is used for outputting a first trigger signal to the controller U1, for the controller U1 controlling the after flow switch K2 to change from the conducting state to the shutting down state;

when a feedback of the feedback circuit 40 is that the voltage stored in the energy storing and outputting circuit 10 is smaller than the first preset voltage vale, the PWM controlling circuit 21 is also used for outputting a second trigger signal, after the second trigger signal is logically treated by the logic circuit 22, the logically treated second trigger signal is sent to the controller U1, for the controller U1 controlling the main switch K1 to change from the shutting down state to the conducting state, the energy storing and outputting circuit 10 is charged again.

In the preferably exemplary embodiment, the PWM controlling circuit 21 includes an error amplifier U2 and a first voltage comparator U3; the logic circuit 32 includes a first nand gate I1, a second nand gate I2, a first inverter I3 and a first trigger RS1; a non-inverting inputting end of the error amplifier U2 inputs the first reference voltage signal VREF, a non-inverting inputting end of the first voltage comparator U3 inputs the second reference voltage signal ISEN, a clock inputting end of the first trigger RS1 inputs the preset clock frequency signal; the controller U1 includes a first driving pin, a second driving pin, a first inputting pin and a second inputting pin, the first driving pin is connected with the controlled end of the main switch K1, the second driving pin of the controller U1 is connected with the controlled end of the after flow switch K2, the first inputting pin of the controller U1 is connected with an outputting end of the first trigger RS1, a second inputting pin of the controller U1 is connected with the outputting end of the testing circuit 30; a inverting inputting end of the error amplifier U2 is the feedback end of the driving circuit 20, an outputting end of the error amplifier U2 is connected with a inverting inputting end of the first voltage comparator U3; an outputting end of the first voltage comparator U3 is connected with a first inputting end of the first nand gate I1, a second inputting end of the first nand gate I1 is connected with an outputting end of the second nand gate I2, an outputting end of the first nand gate I1 is connected with a trigger end of the first trigger RS1 through the first inverter 13; a first inputting end of the second nand gate I2 is connected with an outputting end of the first trigger RS1, a second inputting end of the second nand gate I2 is connected with the outputting end of the testing circuit. In the driving circuit 20, the controller U1 controls the turning on/off state of the main switch K1 and the after switch K2 according to signal inputted by the first inputting pin and the second inputting pin. And the first inverter 13 can be realized by using a NOT gate.

It is to be understood that, the exemplary embodiment of the driving circuit 20 is not limited, in an preferable exemplary embodiment, the driving circuit 20 further includes a current sampling module 23, a first sampling end of the current sampling module 23 is connected with the inputting end of the main switch K1, the current sampling module 23 samples current signal of the inputting end and the outputting end of the main switch K1, and outputs voltage signal corresponding to the current signal; an non-inverting inputting end of the first voltage comparator U3 is connected with the outputting end of the current sampling module 23, for receiving the voltage signal outputted by the current sampling module 23, and the voltage signal is regarded as the second reference voltage signal. The current sampling module 23 samples the current signal of the inputting end and the outputting end of the main switch K1, and outputs the voltage signal corresponding to the current signal to the first voltage comparator U3 of the driving circuit 20, which can be regarded as a reference information for the former driving circuit 20 controlling the working state of the main switch K1 and the after flow switch K2, so that a relevance of the circuits and an accuracy of working can be improved.

The testing circuit 30 can be realized by any circuit which can realize its function, in an preferably exemplary embodiment, the testing circuit 30 includes a first direct-current power supply VDD1, a first switch testing device 31, a current mirroring circuit 32, a first sampling circuit 33, a second sampling circuit 34, a comparing outputting circuit 35, the current mirroring circuit 32 includes a starting end, an inputting end, a first outputting end, a second outputting end, the starting end of the current mirroring circuit 32 is connected with an external power, the inputting end of the current mirroring circuit 32 is connected with the first direct current power supply, the first outputting end of the current mirroring circuit 32 is connected with the first sampling circuit 33, the second outputting end of the current mirroring circuit 32 is connected with the second sampling circuit 34; the first switch testing device 31 includes a first testing end, a second testing end, and a controlling end, the first testing end of the first switch testing device 31 is connected with the connecting node of the main switch K1 and the after flow switch K2; the second testing end of the first switch testing device 31 is connected with the controlled end of the after flow switch K2; the first controlling end of the first switch testing device 31 is connected with the first sampling circuit 33, the second controlling end of the first switch testing device 31 is connected with the second sampling circuit 34. In the exemplary embodiment, the first switch testing device 31 tests that voltage on the controlled end of the after flow switch K2 is high level, and the voltage on the connecting node of the main switch K1 and the after flow switch K2 is larger than zero, the first switch testing device 31 controls the current mirroring circuit 32 to work at a first outputting mode, so that a voltage value sampled by the second sampling circuit 34 is larger than a voltage value sampled by the first sampling circuit 33; when the voltage sampled by the first sampling circuit 33 is larger than the voltage sampled by the second sampling circuit 34, the comparing outputting circuit 35 outputs the first controlling signal. When the voltage on the controlled end of the after flow switch K2 is ht high level, the after flow switch K2 is turn on to supply after flow loop to the energy storing and outputting circuit 10, when the voltage on the connecting node of the main switch K1 and the after flow switch K2 is larger than zero, it indicates that a current direction of the after flow loop is opposite to a current direction of a circulation loop.

In the preferable exemplary embodiment, the first switch testing device 31 includes a second inverter I4, a first switching tube M1, a second switching tube M2 and a seventh switching tube M7; the current mirroring circuit 32 includes a third switching tube M3, a fourth switching tube M4, a fifth switching tube M5 and a sixth switching tube M6; the comparing outputting circuit 33 includes a second voltage comparator U4, a second trigger RS2 and a third inverter I5; the first sampling circuit 34 includes a third resistor R3 and a fifth resistor R5; the second sampling circuit 35 includes a fourth resistor R4 and a sixth resistor R5.

And, an inputting end of the second inverter I4 is connected with the controlled end of the after flow switch K2, an outputting end of the second inverter I4 is connected with a gate of the first switching tube M1; a drain of the first switching tube M1 is earthed, a source of the first switching tube M1 is connected with a drain of the second switching tube M2; a gate of the second switching tube M2 is connected with the controlled end of the after flow switch K2, the source of the second switch tube M2 is connected with the connecting node of the main switch K1 and the after flow switch K2; a gate of the third switching tube M3, a gate of the fourth switching tube M4, a gate of the fifth switching tube M5 and a gate of the sixth switching tube M6 are connected with each other, and after connected with each other, the gate of the third switching tube M3, the gate of the fourth switching tube M4, the gate of the fifth switching tube M5 and the gate of the sixth switching tube M6 are connected with the external power controlling the conducting of the third switching tube M3, the fourth switching tube M4, the fifth switching tube M5 and the sixth switching tube M6; the source of the third switching tube M3, a source of the fourth switching tube M4, a source of the fifth switching tube M5 and a source of the sixth switching tube M6 are connected with each other, and after connected with each other, the third switching tube M3, the fourth switching tube M4, the fifth switching tube M5 and the sixth switching tube M6 are connected with the first direct current power VDD1, a drain of the third switching M3 is connected the gate; a drain of the fourth switching tube M4 is connected with a first end of the third resistor R3; a drain of the fifth switching tube M5 is connected with a source of the seventh switching tube M7; a drain of the sixth switching tube M6 is respectively connected with a first end of the fourth resistor R4 and a drain of the seventh switching tube M7; a gate of the seventh switching tube M7 is connected with a gate of the after flow switch K2; a second end of the third resistor R3 is connected with a first end of the fifth resistor R5; a second end of the fifth resistor R5 is respectively connected with the source of the first switching tube M1 and the drain of the second switching tube M2; a second of the fifth resistor R5 is earthed by the sixth resistor R6; the non-inverting inputting end of the second voltage comparator U4 is connected a connecting node A of the third resistor R3 and the fifth resistor R5, the inverting end of the second voltage comparator U4 is connected with a connecting node B of the fourth resistor R4 and the sixth resistor R6, the outputting end of the second voltage comparator U4 is connected with the inputting end of the second trigger RS2; a trigging end of the second trigger RS2 inputs an external trigger signal, the outputting end of the second trigger RS2 is connected with an inputting end of the third inverter I5, an outputting end of the third inverter I5 is the outputting end of the testing circuit. In the testing circuit 30, the second inverter I4 can be realized by not gate; preferably, the first to seventh switching tube are realized by adopting MOS tube; and the first switching tube M1 and the second switching tube M2 adopts NMOS tube, the third switching tube M3, the fourth switching tube M4, the fifth switching tube M5, the sixth switching tube M6, the seventh switching tube M7 adopt PMOS tube.

The testing circuit 30 aims to determine that whether the direction current in the after flow loop is reverse through testing that whether the voltage on the connecting node LX and the main switch K1 is larger than zero, for adjusting the working state, so that the circuit works stably. It is easy to be understood that, during an after flow period of the after flow switch K2, the main switch is shut down, the first inductor L1 supplies stored energy to the load RL, the current in the after flow loop flows to the first inductor L1 from the ground through the first inductor L1. While the energy stored in the first inductor L1 is limited, the current on the first inductor L1 would gradually decrease over time, when the current on the first conductor L1 decreases to zero, current will flow in an opposite direction, that is, current flows to the ground from the first inductor L1 through the after flow switch K2; at this time, it needs to shut down the the after flow switch K2, for preventing the loading RL stopping working due to that the current in the after flow loop flows in the opposite direction. When the current in the first inductor L1 flows in the opposite direction, the voltage presents that the voltage on the connecting node LX of the main switch K1 and the after flow switch K2 is larger than zero, so, whether the current in the after flow loop flows in opposite direction can be learned by testing that whether the voltage on the connecting node LX of the main switch K1 and the after flow switch K2.

In the testing circuit 30, bias 1 is a given reference signal, which is used for controlling the conducting of the third switching tube M3; the third resistor R3 and the fourth resistor R4 have the same resistance value, the fifth resistor R5 and the sixth resistor R6 have the same resistance value; the third switching tube M3, the fourth switching tube M4, the fifth switching tube M5 and the sixth switching tube M6 form the current mirror by PMOS tube, such that current flows through the fourth switching tube M4, the fifth switching tube M5 and the sixth switching tube M6 is consistent. The seventh switching tube M7 is used for controlling the current flowing through a branch of the fourth resistor R4 and the sixth resistor R6; and, when the seventh switching tube M7 opens, current flowing through a branch of the fourth resistor R4 and the sixth resistor R6 is twice as the current flowing through the branch of the third resistor R3 and the fifth resistor R5, as the resistance vales of the two branch are the same, so, a voltage on point A in FIG. 2 is also smaller than a voltage on the point B; when the seventh switching tube shuts down, the current flowing through the branch of the fourth resistor R4 and the sixth resistor R6 is the same as the current flowing through the branch of the third resistor R3 and the fifth resistor R5, at this time, the voltage on the point A and the voltage on the point B are the same.

And, when voltage on the connecting node LS of the second outputting pin of the controller U1 and the after flow switch K2 is low level, the first switching tube M1 of the testing circuit 30 is shut down, the second switching tube M2 is turn on, the seventh switching tube M7 is turn on simultaneously, at this time the current flowing through the branch of the fourth resistor R4 and the sixth resistor R6 is twice the current flowing through the branch of the third resistor R3 and the fifth resistor R5, that is, and electric level inputted by the non-inverting inputting end of the second voltage comparator U4 is lower than voltage inputted by the inverting inputting end of the second voltage comparator U4, after the second voltage comparator U4 compares the voltage, the second voltage comparator U4 outputs the low level, after the low level flows through the second trigger RS2, the high level is outputted, then the high level is reversed by the third inverter I5, a Load-info signal of low level is outputted, at this time the load RL is in overloading state; the first inductor L1 works at the current continuous mode, inductive current on the first inductor L1 is always larger than zero, the current would not reverse, the power converter works at the pulse width modulation (PWM) mode, during the pulse width modulation mode, the switching cycle of the circuit is not changed, a duty ratio of the main switch K1 and the after flow switch K2 is adjusted to for outputting power stably, for the loading RL working.

When the voltage on the connecting node LS of the second outputting pin of the controller U1 and the after flow switch K2 is the high level, the first switching tube M1 turns on, the second switching tube M2 and the seventh switching tube M7 both shut down, as when the first switching tube is conducting, the second end of the fifth resistor R5 is the voltage on the connecting node LX, at this time the current flowing through the branch of the fourth resistor R4 and the sixth resistor R6 is equal to the current flowing through the branch of the third resistor R3 and the fifth resistor R5, so that, the level inputted by the non-inverting inputting end of the second voltage comparator U4 is equal to the level inputted by the inverting inputting end of the second voltage comparator U4, at this time the second voltage comparator U4 is in a zero bound state; and at this time if the voltage on the connecting node LX is larger than zero (that is, the current flowing through the after flow loop reverses), an electric potential of the point A is larger than an electric potential of the point B, that is, the level inputted by the non-inverting inputting end of the second voltage comparator U4 is higher than the level inputted by the inverting inputting end of the second voltage comparator U4, the level inputted by the second voltage comparator U4 is compared to output the high level, the high level is triggered by the second trigger RS2, the low level is outputted, the low level is reversed by the third inverter T5, the Load-info signal of the high level is outputted, at this time, the load RL is in light loading state, the first inductor L1 works at a discontinuous current mode, a inductive current on the first inductor L1 will decrease to zero and below zero, when decreasing to zero and below zero, the current will reverse, while the controller U1 is triggered by the high level Load-info signal outputted by the testing circuit 30 for shutting down the after flow switch K2, the preventing the current flowing through the after flow switch K2 from reversing is realized, so that the circuit works normally, and the first inductor L1 works at the discontinuous current mode. When the first inductor L1 works at the discontinuous current mode, the whole of the power converter works at a frequency modulation mode (PFM), during the frequency modulation mode, the conducting time of the main switch is not changed, the switching cycle of the circuit is changed for adjusting the outputting power to enable the load RL to work.

It is to be understood that, the exemplary embodiment of the testing circuit 30 is not limited, in a further exemplary embodiment, the testing circuit 30 further includes a delay module 36 used for triggering the shut down of the main switch K1, an inputting end of the delay module 35 is respectively connected with the first outputting pin of the controller U1 and the controlled end of the main switch K1, an outputting end of the delay module 36 is connected with the triggering end of the second trigger RS2; when the delay module 36 tests that the main switch K1 turns on, the delay module 36 outputs a delay signal for controlling the testing circuit 30 outputting the first controlling signal after a preset time. In detail, the delay module 36 triggers when the main switch turns on, that is, the delay module 36 can determine the conducting time of the main switch, that is, the delay module 36 can determine the charging time of the first inductor L1.

And, the delay module 36 can be realized by any circuit having delay function, in an preferable exemplary embodiment, the delay module 36 includes an energy-storing device 361 and a second switch testing device 362 connected with the energy-storing device, when the second switch testing device 362 tests that the main switch K1 is turn on, the energy-storing device 361 is used for storing energy, and when an energy-storing voltage is larger than a preset voltage value, the energy-storing device 361 is used for outputting the delay signal.

In detail, the second switch testing device 62 includes a second direct current power VDD2, a fourth inverter 16, a fifth inverter 17, an eighth switching tube M8 and a ninth switching tube M9; the energy-storing device 361 includes a sixth inverter 18, a tenth switching tube M10, an eleventh switching tube M11, a twelfth switching tube M12 and a second capacitor C2; and an inputting end of the fourth inverter 16 is connected with the controlled end of the main switch K1, an outputting end of the fourth inverter 16 is connected with an inputting end of the fifth inverter 17, an outputting end of the fifth inverter 17 is connected with a gate of the eighth switching tube M8; a drain of the eighth switching tube M8 is earthed, a source of the eighth switching tube M8 is connected a drain of the ninth switching tube M9; a source of the ninth switching tube M9, a source of the tenth switching tube M10 and a source of the eleventh switching tube M11 are connected with each other, and after connected with each other, the source of the ninth switching tube M9, the source of the tenth switching tube M10 and the source of the eleventh switching tube M11 are connected with second direct current power VDD2; a gate of the ninth switching tube M9 inputs an external power for controlling the conducting of the eighth switching tube M8; a gate of the tenth switching tube M10 is earthed, a drain of the tenth switching tube M10 is connected with the a drain of the twelfth switching tube M12; a gate of the eleventh switching tube M11 is connected with an outputting end of the third inverter I5, a drain of the eleventh switching tube M11 is connected with an inputting end of the sixth inverter 18, an outputting end of the sixth inverter 18 is connected with the trigger end of the second trigger RS2; a gate of the twelfth switching tube M12, a drain of the eighth of the switching tube M8, a drain of the ninth switching tube M9 and a first end of the second capacitor C2 are connected with each other, a source of the twelfth switching tube M12 and a second end of the second capacitor C2 are respectively earthed.

In the delay module 36, the second direct current power VDD2 and the first direct current power VDD1 can be different current power, can also be the same current power. Of course, when the second direct current power VDD2 and the first direct current power VDD1 are the same current power, a hardware cost of the circuit can be saved; and bias 2 can be given reference signal, which is used for controlling the conducting of the ninth switching tube M9, the bias 2 and the bias 1 can be the same reference signal; the fourth inverter 16, the fifth inverter 17 and the sixth inverter 18 can be realized by not gate, which can be used for reversing the inputting signal, the eighth switching tube M8 and the tenth switching tube M12 can be NMS tube, the ninth switching tube M9, the tenth switching tube M10, the eleventh switching tube M11 can be PMOS tube, the function of the delay module 36 is generating a preset microsecond delay, a falling edge of the gate triggering voltage HS signal of the main switch K1 starts (that is, the main switch K1 is just turning on), the eighth switching tube M8 ends, the ninth switching tube M9 turns on to charging the second capacitor C2, When the second capacitor C2 is charged for that the capacitor voltage of the second capacitor C2 is larger than the capacitor voltage of the twelfth switching tube M12, the twelfth switching tube M12 opens, the inputting end of the sixth inverter 18 is earthed, so that the outputting end of the sixth inverter 18 outputs the Delay signal, the Delay signal is high level, the Delay signal is transmitted to the triggering end of the second trigger RS2 of the testing circuit 30, so that the second trigger RS2 outputs the high level signal, the third inverter I5 reverses the high level signal for outputting low level Load-info signal, the low level Load-info signal is regarded as the delay triggering signal and transmitted to the second inputting end of the second nand gate of the driving circuit 20, so that the high level signal DRV outputted to the controller U1 by the first trigger RS1 can passes through the controller U1 for turning off the main switch K1 and turning on the after flow switch K2, the load RL is powered through the after flow loop. It is to be understood that, during the process, during the charging process of the second capacitor C2, the Delay signal changes from low to high, so that the Load-info signal changes from high to low, while when the Load-info signal changes to the low level, the main switch K1 changes from the conducting state to the shut down state, so, the period from the turning on of the main switch K1 to the decreasing of the Load-info for turning off the main switch K1 can be regarded as the conducting time of the main switch K1, that is the charging time of the first inductor L1.

Referring to FIGS. 1-3, the circuit principle of the present disclosure is further described:

When the voltage feedback by the feedback circuit 40 decreases, the COMP voltage outputted by the outputting end of the error amplifier U2 increases, when the COMP voltage increases and is larger than a reference voltage ISEN inputted by the non-inverting inputting end of the first voltage comparator U3, the outputting end PWM-OUT of the first voltage comparator U3 outputs the low level signal to the first inputting end of the first nand gate I1, and the low level signal is outputted to the trigger end of the first trigger RS1 after passing through the second nand gate I2 and the first inverter I3, and the low level signal is regarded as an outputting triggering signal OFF of the first trigger RS1, at this time the triggering signal OFF is low level, when the clock signal CLK inputted by the inputting end of the first trigger RS1 is a rising edge, the triggering signal OFF is triggered for the controller U1 controlling the conducting of the main switch K1; when the main switch K1 is conducting, the first inductor L1 and the first capacitor C1 save energy, the voltage feedback by the feedback circuit 40 increases gradually, at the same time the current of the main switch K1 increases gradually, ISEN voltage increases gradually, when the ISEN voltage increase to be larger than the reference voltage VREF inputted by the non-inverting inputting end of the error amplifier U2, COMP voltage of the outputting end of the error amplifier U2 decreases, when the ISEN voltage is larger than the COMP voltage, PWM-OUT is high level, as at this time Load-info and DRV are both high level, so COMP voltage can be transmitted to OFF immediately, and transmitted to OFF when the Load-info is decrease, a period from turning on the main switch K1 to the Load-info decreasing is the conducting time of the main switch K1, that is, during the light loading, the conducting time of the main switch K1 is not changed. When the Load-info is decreasing, high level of PWM-OUT is transmitted to OFF, voltage DRV outputted by the trigger RS1 is low level, at this time the main switch K1 is shut down, at the same time the after flow switch K2 is turning on, the current of the first inductor L1 decreases, at this time whether the current of the after flow loop reverses can be adjusted by testing the voltage of the connecting node LX of the main switch K1 and the after flow switch K2 through the testing circuit 30, and when the current of the loop reverses, the testing circuit 30 outputs high level Load-info signal for controlling the shutting down of the after flow switch K2, at this time, the inductor current is zero, hereafter the state continues, so that the circuit enters into the frequency modulation mode; at this time feedback voltage FB starts decreasing, as a load current is small, the decreasing speed of the feedback voltage FB is slow, the shutting down time of the main switch K1 and the after flow switch K2 is long, so the working efficiency of the power converter is improved; when the voltage outputted by the outputting end COMP of the error amplifier U2 is larger than the inputting voltage ISEN of the first voltage comparator U3 due to the slowly decreasing of the feedback voltage FB, PWM-OUT outputs low level, so OFF is low level, when the rising edge of the clock signal CLK comes, the voltage DRV outputted by the trigger RS1 is high level, the main switch K1 turns on, the whole loop enters into a next cycle.

It is to be understood that, the power converter at the frequency modulation mode(PFM), the inductive current is discontinuous, a working period Td of the main switch K1 and the after flow switch K2 is larger than another working period Tc of the main switch K1 and the after flow switch K2 working at the pulse width modulation mode (PWM), as the switching frequency f is related with the switching period T, and f=1/T, so, in a fixed time, the switching times of the main switch K1 and the after flow switch K2 working at the frequency modulation mode are smaller than the main switch K1 and the after flow switch K2 working at pulse width modulation mode, so the switching consumption of the circuit is reduced, the power utilization rate is improved.

The present disclosure also provides a switch power supply device, the switch power supply device includes the above power converter, the detail structure of the power converter can be referenced to the above exemplary embodiments, no need to repeated again; it is to be understood that, as the witch power supply device uses the above power converter, so, the exemplary embodiment of the switch power supply device includes all technical proposals of all the exemplary embodiments of the power converter, and the achieved technical effects are the same, no need to repeated again.

Above is only the preferred embodiments of the present disclosure, and the present disclosure is not limited to such embodiments. The present disclosure is intended to cover all modifications, equivalent replacements and improvements falling within the spirit and scope of the disclosure defined in the appended claims.

What is claimed is:

1. A power converter, comprising: a main switch and an after flow switch connected in series between a power supply and ground, an energy storing and outputting circuit connected with a connecting node of the main switch and the after flow switch, a driving circuit changing connecting states of the main switch and the after flow switch according to a preset clock frequency, when the main switch being conducting, the energy storing and outputting circuit being in an energy-storing state and an outputting state; when the after flow switch being conducting, the energy storing and outputting circuit being in the outputting state; when the energy storing and outputting circuit being in the outputting state, the energy storing and outputting circuit supplying a working voltage to a load;

the power converter comprising a testing circuit and a feedback circuit, a signal acquiring end of the testing circuit being connected with the connecting mode of the main switch and the after flow switch, an outputting end of the testing circuit being connected with the driving circuit; a signal acquiring end of the feedback circuit being connected with an outputting end of the energy-storing circuit, an outputting end of the feedback circuit being connected with a feedback end of the driving circuit;

the testing circuit, which being used for testing a voltage on the connecting node of the main switch and the after flow switch, when the voltage on the connecting node being larger than zero, the testing circuit outputting a first controlling signal to the driving circuit, allowing the driving circuit controlling the after flow switch to change from the conducting state to a shutting down state, and the load working normally through the voltage stored in the energy storing and outputting circuit;

the feedback circuit, which being used for testing the voltage stored in the energy storing and outputting circuit, and when the voltage stored in the energy storing and outputting circuit being smaller than a first preset voltage value, the feedback circuit outputting a trigger signal to the driving circuit, allowing the driving circuit controlling the main switch to change from the shutting down state to the conducting state, and the energy-storing device being charged again;

wherein the driving circuit comprises a controller, a PWM controlling circuit and a logic circuit; the PWM controlling circuit comprises a first end inputting a first reference voltage signal, a second end inputting a second reference voltage signal; the logic circuit comprises a first end connected with an outputting end of the PWM controlling circuit, and a second end used for receiving the first controlling signal, a third end used for inputting a preset clock frequency and an outputting end; the outputting end of the logic circuit is connected with the controller; when a feedback of the feedback circuit is that the voltage stored in the energy storing and outputting circuit is smaller than the first preset voltage value, the PWM controlling circuit is used for outputting a second trigger signal, after the second trigger signal is logically treated, the logically treated second trigger signal is sent to the controller, for the controller controlling the main switch to change from the shutting down state to the conducting state, the energy storing and outputting circuit is charged again; and wherein the PWM controlling circuit comprises an error amplifier and a first voltage comparator; the logic circuit comprises a first nand gate, a second nand gate, a first inverter and a first trigger; a non-inverting inputting end of the error amplifier inputs the first reference voltage signal, a non-inverting inputting end of the first voltage comparator inputs the second reference voltage signal, a clock inputting end of the first trigger inputs the preset clock frequency signal; the controller comprises a first driving pin, a second driving pin, a first inputting pin and a second inputting pin, the first driving pin is connected with a controlled end of the main switch, the second driving pin of the controller is connected with a controlled end of the after flow switch, the first inputting pin of the controller is connected with an outputting end of the first trigger, a second inputting pin of the controller is connected with the outputting end of the testing circuit; a inverting inputting end of the error amplifier is the feedback end of the driving circuit, an outputting end of the error amplifier is connected with a inverting inputting end of the first voltage comparator; an outputting end of the first voltage comparator is connected with a first inputting end of the first nand gate, a second inputting end of the first nand gate is connected with an outputting end of the second nand gate, an outputting end of the first nand gate is connected with a trigger end of the first trigger through the first inverter; a first inputting end of the second nand gate is connected with an outputting end of the first trigger, a second inputting end of the second nand gate is connected with the outputting end of the testing circuit.

2. The power converter according to claim 1, wherein the load comprises a power supply end and a ground end, the power supply end is connected with the outputting end of the energy storing and outputting circuit, the ground end of the load is earthed; the energy storing and outputting circuit comprises a first inductor and a first capacitor, an inputting end of the first inductor is connected with the connecting node of the main switch and the after flow switch, an outputting end of the first inductor is connected with a first end of the first capacitor, and one end of the outputting end of the first inductor connected with the first end of the capacitor is the outputting end of the energy-storing outputting circuit; a second end of the first capacitor is earthed.

3. The power converter according to claim 1, wherein the feedback circuit comprises a first resistor and a second resistor, a first end of the first resistor is connected between the outputting end of the energy storing and outputting circuit and the power supply end of the load, a second end of the first resistor is earthed through the second resistor; a connecting node of the first resistor and the second resistor is the outputting end of the feedback circuit.

4. The power converter according to claim 1, wherein the driving circuit further comprises a current sampling module, a first sampling end of the current sampling module is connected with the inputting end of the main switch, a second sampling end of the current sampling module is connected with the outputting end of the main switch; the current sampling module samples current signals of the inputting end and the outputting end of the main switch, and outputs voltage signals corresponding to the current signals; an non-inverting inputting end of the first voltage comparator is connected with the outputting end of the current sampling module, for receiving the voltage signal outputted by the current sampling module, and the voltage signal is regarded as the second reference voltage signal.

5. The power converter according to claim 1, wherein the testing circuit comprises a first direct-current power supply, a first switch testing device, a current mirroring circuit, a first sampling circuit, a second sampling circuit, a comparing outputting circuit, the current mirroring circuit comprises a starting end, an inputting end, a first outputting end, a second outputting end, the starting end of the current mirroring circuit is connected with an external power, the inputting end of the current mirroring circuit is connected with the first direct current power supply, the first outputting end of the current mirroring circuit is connected with the first sampling circuit, the second outputting end of the current mirroring circuit is connected with the second sampling circuit; the first switch testing device comprises a first testing end, a second testing end, and a controlling end, the first testing end of the first switch testing device is connected with the connecting node of the main switch and the after flow switch; the second testing end of the first switch testing device is connected with the controlled end of the after flow switch; the first controlling end of the first switch testing device is connected with the first sampling circuit, the second controlling end of the first switch testing device is connected with the second sampling circuit;

the first switch testing device tests that a voltage on the controlled end of the after flow switch is high level, and a voltage on the connecting node of the main switch and the after flow switch is larger than zero, the first switch testing device controls the current mirroring circuit to work at a first outputting mode, for a voltage value sampled by the second sampling circuit being larger than a voltage value sampled by the first sampling circuit;

when the voltage sampled by the first sampling circuit is larger than the voltage sampled by the second sampling circuit, the comparing outputting circuit outputs the first controlling signal.

6. The power converter according to claim 5, wherein the first switch testing device comprises a second inverter, a first switching tube, a second switching tube and a seventh switching tube; the current mirroring circuit comprises a third switching tube, a fourth switching tube, a fifth switching tube and a sixth switching tube; the comparing outputting circuit comprises a second voltage comparator, a second trigger and a third inverter; the first sampling circuit comprises a third resistor and a fifth resistor; the second sampling circuit comprises a fourth resistor and a sixth resistor; an inputting end of the second inverter is connected with the controlled end of the after flow switch, an outputting end of the second inverter is connected with a gate of the first switching tube; a drain of the first switching tube is earthed, a source of the first switching tube is connected with a drain of the second switching tube; a gate of the second switching tube is connected with the controlled end of the after flow switch, the source of the second switch tube is connected with the connecting node of the main switch and the after flow switch; a gate of the third switching tube, a gate of the fourth switching tube, a gate of the fifth switching tube and a gate of the sixth switching tube are connected with each other, and after connected with each other, the gate of the third switching tube, the gate of the fourth switching tube, the gate of the fifth switching tube and the gate of the sixth switching tube are connected with the external power controlling the conducting of the third switching tube, the fourth switching tube, the fifth switching tube and the sixth switching tube; a source of the third switching tube, a source of the fourth switching tube, a source of the fifth switching tube and a source of the sixth switching tube are connected with each other, and after connected with each other, the third switching tube, the fourth switching tube, the fifth switching tube and the sixth switching tube are connected with the first direct current power, a drain of the third switching tube is connected the gate; a drain of the fourth switching tube is connected with a first end of the third resistor; a drain of the fifth switching tube is connected with a source of the seventh switching tube; a drain of the sixth switching tube is respectively connected with a first end of the fourth resistor and a drain of the seventh switching tube; a gate of the seventh switching tube is connected with a gate of the after flow switch; a second end of the third resistor is connected with a first end of the fifth resistor; a second end of the fifth resistor is respectively connected with the source of the first switching tube and the drain of the second switching tube; a second of the fourth resistor is earthed by the sixth resistor; the non-inverting inputting end of the second voltage comparator is connected a connecting node of the third resistor and the fifth resistor, the inverting end of the second voltage comparator is connected with a connecting node of the fourth resistor and the sixth resistor, the outputting end of the second voltage comparator is connected with the inputting end of the second trigger; a trigging end of the second trigger inputs an external trigger signal, the outputting end of the second trigger is connected with an inputting end of the third inverter, an outputting end of the third inverter is the outputting end of the testing circuit.

7. The power converter according to claim 5, wherein the testing circuit further comprises a delay module used for triggering a shutting down of the main switch, an inputting end of the delay module is respectively connected with the first outputting pin of the controller and the controlled end of the main switch, an outputting end of the delay module is connected with the trigger end of the second trigger; when the main switch is turn on, the delay module is used for outputting a delay signal for controlling the testing circuit outputting the first controlling signal after a preset time.

8. The power converter according to claim 7, wherein the delay module comprises an energy-storing device and a second switch testing device connected with the energy-storing device, when the second switch testing device tests that the main switch is turn on, the energy-storing device is used for storing energy, and when the energy-storing voltage is larger than a preset voltage value, the energy-storing device outputs the delay signal.

9. The power converter according to claim 8, wherein the second switch testing device comprises a second direct current power, a fourth inverter, a fifth inverter, an eighth switching tube and a ninth switching tube; the energy-storing device comprises a sixth inverter, a tenth switching tube, an eleventh switching tube, a twelfth switching tube and a second capacitor, an inputting end of the fourth inverter is connected with the controlled end of the main switch, an outputting end of the fourth inverter is connected with an inputting end of the fifth inverter, an outputting end of the fifth inverter is connected with a gate of the eighth switching tube; a drain of the eighth switching tube is earthed, a source of the eighth switching tube is connected a drain of the ninth switching tube; a source of the ninth switching tube, a source of the tenth switching tube and a source of the eleventh switching tube are connected with each other, and after connected with each other, the source of the ninth switching tube, the source of the tenth switching tube and the source of the eleventh switching tube are connected with a second direct current power; a gate of the ninth switching tube inputs an external power for controlling the conducting of the eighth switching tube; a gate of the tenth switching tube is earthed, a drain of the tenth switching tube is connected with the a drain of the twelfth switching tube; a gate of the eleventh switching tube is connected with an outputting end of the third inverter, a drain of the eleventh switching tube is connected with an inputting end of the sixth inverter, an outputting end of the sixth inverter is connected with the trigger end of the second trigger; a gate of the twelfth switching tube, a drain of the eighth of the switching tube, a drain of the ninth switching tube and a first end of the second capacitor are connected with each other, a source of the twelfth switching tube and a second end of the second capacitor are respectively earthed.

10. A switching power supply device, comprising the power converter as claimed in claim 1; the power converter comprising a main switch and an after flow switch connected in series between a power supply and a ground, an energy storing and outputting circuit connected with a connecting node of the main switch and the after flow switch, a driving circuit changing connecting states of the main switch and the after flow switch according to a preset clock frequency, when the main switch being conducting, the energy storing and outputting circuit being in a charging energy-storing state and an outputting state; when the after flow switch being conducting, the energy storing and outputting circuit being in the outputting state; when the energy storing and outputting circuit being in the outputting state, the energy storing and outputting circuit supplying a working voltage to a load;

the power converter comprising a testing circuit and a feedback circuit, a signal acquiring end of the testing circuit being connected with the connecting mode of the main switch and the after flow switch, an outputting end of the testing circuit being connected with the driving circuit; a signal acquiring end of the feedback circuit being connected with an outputting end of the energy-storing circuit, an outputting end of the feedback circuit being connected with a feedback end of the driving circuit;

the testing circuit, which being used for testing a voltage on the connecting node of the main switch and the after flow switch, when the voltage on the connecting node being larger than zero, the testing circuit outputting a first controlling signal to the driving circuit, allowing the driving circuit controlling the after flow switch to change from the conducting state to a shutting down state, and the load working normally through the voltage stored in the energy storing and outputting circuit;

the feedback circuit, which being used for testing the voltage stored in the energy storing and outputting circuit, and when the voltage stored in the energy storing and outputting circuit being smaller than a preset voltage value, the feedback circuit outputting a trigger signal to the driving circuit, allowing the driving circuit controlling the main switch to change from the shutting down state to the conducting state, and the energy-storing device being charged again;

wherein the driving circuit comprises a controller, a PWM controlling circuit and a logic circuit; the PWM controlling circuit comprises a first end inputting a first reference voltage signal, a second end inputting a second reference voltage signal; the logic circuit comprises a first end connected with an outputting end of the PWM controlling circuit, and a second end used for receiving the first controlling signal, a third end used for inputting a preset clock frequency and an outputting end; the outputting end of the logic circuit is connected with the controller; when a feedback of the feedback circuit is that the voltage stored in the energy storing and outputting circuit is smaller than the first preset voltage value, the PWM controlling circuit is used for outputting a second trigger signal, after the second trigger signal is logically treated, the logically treated second trigger signal is sent to the controller, for the controller controlling the main switch to change from the shutting down state to the conducting state, the energy storing and outputting circuit is charged again; and wherein the PWM controlling circuit comprises an error amplifier and a first voltage comparator; the logic circuit comprises a first nand gate, a second nand gate, a first inverter and a first trigger; a non-inverting inputting end of the error amplifier inputs the first reference voltage signal, a non-inverting inputting end of the first voltage comparator inputs the second reference voltage signal, a clock inputting end of the first trigger inputs the preset clock frequency signal; the controller comprises a first driving pin, a second driving pin, a first inputting pin and a second inputting pin, the first driving pin is connected with a controlled end of the main switch, the second driving pin of the controller is connected with a controlled end of the after flow switch, the first inputting pin of the controller is connected with an outputting end of the first trigger, a second inputting pin of the controller is connected with the outputting end of the testing circuit; a inverting inputting end of the error amplifier is the feedback end of the driving circuit, an outputting end of the error amplifier is connected with a inverting inputting end of the first voltage comparator; an outputting end of the first voltage comparator is connected with a first inputting end of the first nand gate, a second inputting end of the first nand gate is connected with an outputting end of the second nand gate, an outputting end of the first nand gate is connected with a trigger end of the first trigger through the first inverter; a first inputting end of the second nand gate is connected with an outputting end of the first trigger, a second inputting end of the second nand gate is connected with the outputting end of the testing circuit.

11. The switching power supply device according to claim 10, wherein the driving circuit further comprises a current sampling module, a first sampling end of the current sampling module is connected with the inputting end of the main switch, a second sampling end of the current sampling module is connected with the outputting end of the main switch; the current sampling module samples current signals of the inputting end and the outputting end of the main switch, and outputs voltage signals corresponding to the current signals; an non-inverting inputting end of the first voltage comparator is connected with the outputting end of the current sampling module, for receiving the voltage signal outputted by the current sampling module, and the voltage signal is regarded as the second reference voltage signal.

12. The switching power supply device according to claim 10, wherein the testing circuit comprises a first direct-current power supply, a first switch testing device, a current mirroring circuit, a first sampling circuit, a second sampling circuit, a comparing outputting circuit, the current mirroring circuit comprises a starting end, an inputting end, a first outputting end, a second outputting end, the starting end of the current mirroring circuit is connected with an external power, the inputting end of the current mirroring circuit is connected with the first direct current power supply, the first outputting end of the current mirroring circuit is connected with the first sampling circuit, the second outputting end of the current mirroring circuit is connected with the second sampling circuit; the first switch testing device comprises a first testing end, a second testing end, and a controlling end, the first testing end of the first switch testing device is connected with the connecting node of the main switch and the after flow switch; the second testing end of the first switch testing device is connected with the controlled end of the after flow switch; the first controlling end of the first switch testing device is connected with the first sampling circuit, the second controlling end of the first switch testing device is connected with the second sampling circuit;

the first switch testing device tests that a voltage on the controlled end of the after flow switch is high level, and a voltage on the connecting node of the main switch and the after flow switch is larger than zero, the first switch testing device controls the current mirroring circuit to work at a first outputting mode, for a voltage value sampled by the second sampling circuit being larger than a voltage value sampled by the first sampling circuit;

when the voltage sampled by the first sampling circuit is larger than the voltage sampled by the second sampling circuit, the comparing outputting circuit outputs the first controlling signal.

13. The switching power supply device according to claim 12, wherein the first switch testing device comprises a second inverter, a first switching tube, a second switching tube and a seventh switching tube; the current mirroring circuit comprises a third switching tube, a fourth switching tube, a fifth switching tube and a sixth switching tube; the comparing outputting circuit comprises a second voltage comparator, a second trigger and a third inverter; the first sampling circuit comprises a third resistor and a fifth resistor; the second sampling circuit comprises a fourth resistor and a sixth resistor; an inputting end of the second inverter is connected with the controlled end of the after flow switch, an outputting end of the second inverter is connected with a gate of the first switching tube; a drain of the first switching tube is earthed, a source of the first switching tube is connected with a drain of the second switching tube; a gate of the second switching tube is connected with the controlled end of the after flow switch, the source of the second switch tube is connected with the connecting node of the main switch and the after flow switch; a gate of the third switching tube, a gate of the fourth switching tube, a gate of the fifth switching tube and a gate of the sixth switching tube are connected with each other, and after connected with each other, the gate of the third switching tube, the gate of the fourth switching tube, the gate of the fifth switching tube and the gate of the sixth switching tube are connected with the external power controlling the conducting of the third switching tube, the fourth switching tube, the fifth switching tube and the sixth switching tube; a source of the third switching tube, a source of the fourth switching tube, a source of the fifth switching tube and a source of the sixth switching tube are connected with each other, and after connected with each other, the third switching tube, the fourth switching tube, the fifth switching tube and the sixth switching tube are connected with the first direct current power, a drain of the third switching tube is connected the gate; a drain of the fourth switching tube is connected with a first end of the third resistor; a drain of the fifth switching tube is connected with a source of the seventh switching tube; a drain of the sixth switching tube is respectively connected with a first end of the fourth resistor and a drain of the seventh switching tube; a gate of the seventh switching tube is connected with a gate of the after flow switch; a second end of the third resistor is connected with a first end of the fifth resistor; a second end of the fifth resistor is respectively connected with the source of the first switching tube and the drain of the second switching tube; a second of the fourth resistor is earthed by the sixth resistor; the non-inverting inputting end of the second voltage comparator is connected a connecting node of the third resistor and the fifth resistor, the inverting end of the second voltage comparator is connected with a connecting node of the fourth resistor and the sixth resistor, the outputting end of the second voltage comparator is connected with the inputting end of the second trigger; a trigging end of the second trigger inputs an external trigger signal, the outputting end of the second trigger is connected with an inputting end of the third inverter, an outputting end of the third inverter is the outputting end of the testing circuit.

14. The switching power supply device according to claim 12, wherein the testing circuit further comprises a delay module used for triggering a shutting down of the main switch, an inputting end of the delay module is respectively connected with the first outputting pin of the controller and the controlled end of the main switch, an outputting end of the delay module is connected with the trigger end of the second trigger; when the main switch is turn on, the delay module is used for outputting a delay signal for controlling the testing circuit outputting the first controlling signal after a preset time.

15. The switching power supply device according to claim 14, wherein the delay module comprises an energy-storing device and a second switch testing device connected with the energy-storing device, when the second switch testing device tests that the main switch is turn on, the energy-storing device is used for storing energy, and when the energy-storing voltage is larger than a preset voltage value, the energy-storing device outputs the delay signal.

16. The switching power supply device according to claim 15, wherein the second switch testing device comprises a second direct current power, a fourth inverter, a fifth inverter, an eighth switching tube and a ninth switching tube; the energy-storing device comprises a sixth inverter, a tenth switching tube, an eleventh switching tube, a twelfth switching tube and a second capacitor, an inputting end of the fourth inverter is connected with the controlled end of the main switch, an outputting end of the fourth inverter is connected with an inputting end of the fifth inverter, an outputting end of the fifth inverter is connected with a gate of the eighth switching tube; a drain of the eighth switching tube is earthed, a source of the eighth switching tube is connected a drain of the ninth switching tube; a source of the ninth switching tube, a source of the tenth switching tube and a source of the eleventh switching tube are connected with each other, and after connected with each other, the source of the ninth switching tube, the source of the tenth switching tube and the source of the eleventh switching tube are connected with a second direct current power; a gate of the ninth switching tube inputs an external power for controlling the conducting of the eighth switching tube; a gate of the tenth switching tube is earthed, a drain of the tenth switching tube is connected with the a drain of the twelfth switching tube; a gate of the eleventh switching tube is connected with an outputting end of the third inverter, a drain of the eleventh switching tube is connected with an inputting end of the sixth inverter, an outputting end of the sixth inverter is connected with the trigger end of the second trigger; a gate of the twelfth switching tube, a drain of the eighth of the switching tube, a drain of the ninth switching tube and a first end of the second capacitor are connected with each other, a source of the twelfth switching tube and a second end of the second capacitor are respectively earthed.

* * * * *